Sept. 19, 1939.   E. A. TOOHEY ET AL   2,173,797
VIBRATION-DAMPING ELEMENT AND THE METHOD OF MAKING THE SAME Filed Aug. 2, 1935

INVENTORS.
Edward A. Toohey.
George J. Campell.
BY D. N. Halstead.
ATTORNEY.

Patented Sept. 19, 1939

2,173,797

UNITED STATES PATENT OFFICE 2,173,797

VIBRATION-DAMPING ELEMENT AND THE METHOD OF MAKING THE SAME

Edward A. Toohey, Somerville, and George J. Campbell, East Orange, N. J., assignors to Johns-Manville Corporation, New York, N. Y., a corporation of New York Application August 2, 1935, Serial No. 34,350

6 Claims. (Cl. 154—44)

This invention relates to a vibration-damped structure, the damping element for use therein, and to the method of manufacturing the said element.

The invention comprises particularly a vibration-damping element in the form of sheet material provided with closely spaced zones of weakness.

There is in use at this time large quantities of vibration-damping material, for decreasing the rumbling in automobile bodies or the generation of sounds commonly described as "tinny" when a door or drawer of metal furniture or the like is closed.

An embodiment of the invention that is preferred at this time is illustrated in the drawing and will be described in connection therewith.

In the several figures like reference characters denote like parts.

Figure 1:
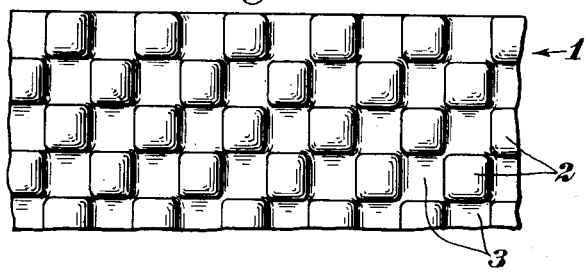
Fig. 1 is a face view of a vibration-damping element provided with irregularities of surface in the form of closely spaced indentations.
Figure 2:
Fig. 2 is an edge view of the article illustrated in Fig. 1.

There are shown sheets I of vibration-damping material provided with an irregular surface including alternating elevations 2 and depressions 3 defining with a base or vibratile object 4, air-filled voids 5 and preferably restricting circulation of air between the voids, as the object 4 vibrates. In other words, the voids are individually non-continuous, in distinction from the elongated continuous voids defined between a corrugated member and a vibratile sheet object. Furthermore, the voids are substantially non-communicating, the air in the said voids being isolated. The vibration-damping element may be provided with a preapplied layer 6 of cementing material before being shaped, as described below, to provide the desired irregularities of surface. The cement is applied continuously over the vibration-damping element, follows the contour thereof and provide no barrier to the direct communication between the vibratile object and the air in a void adjacent thereto.

Figure 3:
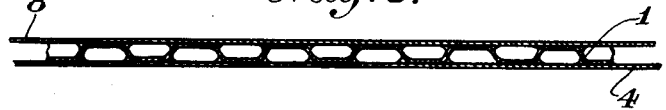
Fig. 3 is a sectional view of a modification of the invention in which the vibration-damping sheet of irregular surface is backed by a stiffening member. The vibratile object is shown also in this figure.

When overall stiffening is required a stiffening member 8, such as a partially saturated rag felt, thin sheet metal, or the like, may be applied, as illustrated in Fig. 3, to the back of the shaped damping material. In a vibration-damped structure, this stiffening member is on the side of the damping material remote from the vibratile object 4 and defines air-filled voids with the damping sheet I.

In producing sharply defined irregularities of surface, such as deep, closely spaced indentations, in a felted sheet of rag fibres or the like, there is difficulty due to shearing or breaking of the felted structure at the positions of greatest deformation of the material, as in the zones between the depressions and elevations. It has now been discovered that the danger of rupture is reduced by impregnating the felted sheet, before the sheet is subjected to treatment to impart the desired irregularities, with a lubricant of the type of a bituminous fluid, that is, a viscous inert liquid, as, for example, pitch, asphalt, heavy petroleum still residues, or the like. In the method of manufacture, there is included this preliminary impregnation step.

The stiffening sheet 8, if used, may contain a lesser proportion of saturant than the member I and may, indeed be a sheet of unimpregnated paper of asbestos, wood fibre, or the like. Such a sheet minimizes danger of staining of upholstery fabric that may be applied over the damping element.

Also, the impregnated sheet may be provided with a preapplied coating of a cementing material, while the surface of the sheet is substantially plane, so that the finished article, after being given the irregular surface, will have substantially the same thickness of cementing layer over depressed, elevated and intermediate portions of the surface. The preapplied coating of cementing material is preferably protected from tearing or distortion as the finished shaped article is separated from the shaping members, as by cheesecloth disposed over the coating.

An illustrative example of the method of making a typical product in accordance with the present invention follows.

There is first provided a felted sheet of rag fibres or the like, such for instance as used as the base material in the manufacture of prepared roofings. Thus, there may be used a rag felt weighing ten pounds more or less to the hundred square feet and having a thickness of about 0.05 to 0.06 inches.

The felt is impregnated with a lubricating fluid.

Thus, the felt may be passed through a hot, fluent asphalt as many times or immersed therein for as long a time as may be required to give the desired degree of saturation. There may be introduced into the felt an amount of saturant or impregnating material that is less than the amount required for saturation, the term "saturation" being used to describe the condition prevailing in conventional asphalt-impregnated rag felt shingles or roofing. An amount of saturation that may be used, for instance, is 75 to 140 parts by weight to 100 parts of the rag felt base.

In making an article to be applied conveniently and thoroughly to a sheet metal panel, a coating of cementing material is applied, advantageously, while the surface of the impregnated sheet material is substantially plane. Thus, there may be applied over a face of the impregnated material an adhesive or cementing composition in flowable, hardenable condition, as, for example, a solution in a volatile solvent therefor of a composition including asphalt, rubber and/or a resin or the like with or without suitable solid filler or other ingredient, to give a finished adhesive film, of desired properties, adapted to adhere to the impregnated damping sheet and also to the vibratile object. The cementing composition may be applied by brushing, rolling on, spraying or other selected method. After application of the cementing composition, hardening of the cementing material is produced, as by evaporation of the solvent at ordinary or somewhat elevated temperatures.

To produce the irregularities of surface, there are selected rigid shaping members having on the surface thereof selected patterns or irregularities to impart to the sheet material pressed therebetween the irregularities of surface of the kind desired. The shaping members acting upon opposite sides of the sheet material have registering elevations and depressions leaving spaces therebetween to receive the sheet material when made to conform approximately to the said registering elevations and depressions.

Thus, there may be used male and female indenting rolls and the sheet material impregnated, as described, passed therebetween.

During this severe shaping, providing alternating elevated and depressed portions, the impregnated material, such as asphalt or the like, provides lubrication between the fibres and also strengthens the individual fibres, with minimizing or complete elimination of the danger of shearing or tearing of the fabric. Furthermore, the impregnating material closes the pores between individual fibres, as well as preventing tears extending through the fabric. The result is a sheet that has a properly shaped surface for the purpose of the present invention and that remains substantially air-impermeable.

Figure 4:
Fig. 4 is a sectional view of a vibration-damped structure including a vibratile object and the improved damping material in contact therewith.
Figure 5:
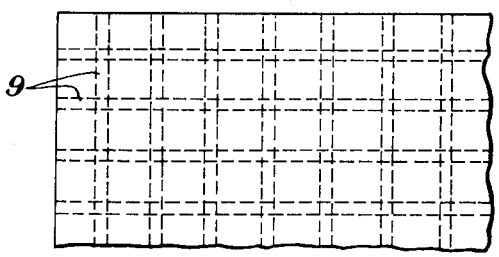
Fig. 5 is a diagrammatic face view of a modified form of damping element.

In making the vibration-damped assembly shown in Fig. 4, the shaped felt is adhered to the vibratile object 4 as by a layer of cementing material 7, suitably by softening the preapplied cementing layer by the application of a solvent therefor and then gently pressing the sheet, with its cementing layer in softened condition, against the vibratile object.

The vibratile object that is most commonly used in thin sheet metal, such as various panels of an automobile body or the like. Since the said object and the damping material in contact therewith are each of substantial area, the irregularities of surface of the damping material define air-filled voids with the vibratile object and, in the preferred form of the invention, restrict circulation of air therebetween. In this restriction of air circulation, the tendency of the cementing material to conform with the vibratile object and to flow appreciably at the time of the application of the damping material to the vibratile object contributes to sealing the voids or minimizing the circulation of air.

When the vibratile object in the assembly described is set in vibration, there is the damping effect of the felted material and impregnating material associated therewith. Also, a substantial amount of energy may be consumed and withdrawn from the vibration of the object by the work done upon the pockets of air defined between the vibration-damping element and the vibratile object.

Also, the shaping of the damping material, as described, provides greater flexibility to the damping material without decreasing the mass thereof, and thus adapts a damping material of given mass to be adhered over an irregular surface, such as a curved panel in an automobile body, with less difficulty due to stiffness of the damping material than would be experienced if the damping material had plane surfaces.

When it is desired to have great flexibility in a damping sheet that is substantially continuously in contact with the vibratile object, the damping element shown in Fig. 6 is utilized. This element is made by indenting or irregularly shaping a sheet, as described, and then pressing the product again to flat form having substantially plane surfaces. Linear zones 9 of weakness formed by the sharp bending or incipient shearing of the sheet material during the shaping to irregular form persist in the finished flat sheet, at closely spaced positions.

As stated, the voids defined between the indented damping sheet and the vibratile object are substantially non-communicating and circulation of air between the various voids is restricted. However, air may pass slowly through the sheet at the zones of weakness where the structure of the sheet has been weakened and its permeability to air decreased during the indenting operation. As a result, air momentarily trapped between the damping material and the vibratile object during the application of the damping material, escapes slowly and does not constitute a permanent disadvantage in the assembly. At the same time, the structure of the zones of weakness is so nearly impermeable that the adhesive used does not bleed therethrough and onto upholstery fabric or the like that may constitute the facing material for the vibration damped assembly.

It will be noted, also, from Fig. 1 that the linear zones of weakness are arranged in a plurality of series. In any one of the series the said linear zones are closely spaced, extend generally parallel to each other, and extend generaly transversely to the direction of the zones in another of the series. For this reason, the damping sheet is flexible in both directions, adapting it to be fitted over curved or irregularly shaped surfaces of the vibratile member and to adhere thereto upon vibration.

It will be understood that the details given are for the purpose of illustration, not restriction, and that variations within the spirit of the invention are intended to be included in the scope of the appended claims.

What we claim is:

1. In making a flexible vibration-damping element, the method which comprises subjecting a flat sheet of felted fibres to an indenting operation, to provide irregularities of surface and cause sharp bending and weakening of the material of the sheet along intersecting linear zones, and then pressing the weakened sheet again to substantially plane surfaced form.

2. A vibration-damping element comprising a sheet of felted fibres provided with closely spaced and intersecting linear zones of weakness extending therethrough and adapted to increase the overall flexibility of the element.

3. A vibration-damping element comprising a sheet of felted fibres provided with closely spaced and intersecting linear zones of weakness adapted to increase the overall flexibility of the element, the said sheet having substantially plane surfaces and being adapted to contact substantially continuously with a vibratile object.

4. A vibration-damping element comprising a plane surfaced asphalt impregnated sheet of felted fibres provided with closely spaced linear zones of weakness extending therethrough the said zones permitting the slow passage of air therethrough.

5. A vibration-damping element comprising a plane surfaced asphalt impregnated sheet of felted fibres provided with closely spaced and intersecting mechanically weakened linear zones extending therethrough said zones increasing the overall flexibility of the element.

6. A vibration-damping element comprising a sheet of matted fibres and provided with a plurality of series of linear zones of weakness extending thru the sheet from face to back, the said zones in each of the series being spaced at close intervals, extending generaly parallel to one another, and extending generally transversely with respect to the zones of weakness in another of the said series.

EDWARD A. TOOHEY.
GEORGE J. CAMPBELL.